United States Patent [19]
Compoly et al.

[11] 3,775,662
[45] Nov. 27, 1973

[54] CONSTANT FREQUENCY POWER INVERTER HAVING SILICON CONTROLLED RECTIFIER MULTIBRIDGE INPUTS FOR OUTPUT WAVE SHAPING WITH VARIABLE PHASE CONTROL FOR OVERLOAD CONDITIONS

[75] Inventors: Albert W. Compoly, Wall; Robert F. Kautz, Spring Lake; Robert C. Eckenfelder, Point Pleasant; Francis X. Foerch, Brick Town, all of N.J.

[73] Assignee: The Bendix Corporation, Teterboro, N.J.

[22] Filed: Dec. 7, 1971

[21] Appl. No.: 205,538

[52] U.S. Cl. ................ 321/5, 321/4, 321/9 R, 321/14, 321/27 R, 321/27 MS, 321/45 C, 321/DIG. 1
[51] Int. Cl. .............................................. H02m 7/48
[58] Field of Search ............... 321/4, 5, 9 R, 11, 321/14, 27 R, 27 MS, 45 C, DIG. 1

[56] References Cited
UNITED STATES PATENTS

| 3,392,318 | 7/1968 | Huntzinger ....................... 321/5 |
| 3,555,397 | 1/1971 | Frank ............................ 321/45 C |
| 3,628,126 | 12/1971 | Kawakami ....................... 321/45 C |
| 3,477,010 | 11/1969 | VeNard .......................... 321/27 R |
| 3,273,041 | 9/1966 | Strohmeier et al. ................ 321/4 |
| 3,609,507 | 9/1971 | Beck ............................. 321/5 |
| 3,543,131 | 11/1970 | Johnston ......................... 321/5 |
| 3,638,094 | 1/1972 | VeNard ......................... 321/DIG. 1 |
| 3,394,299 | 7/1968 | Lawn et al. ..................... 321/14 X |
| 3,423,662 | 1/1969 | Schlabach et al. ................ 321/9 R |

FOREIGN PATENTS OR APPLICATIONS

| 6,405,616 | 5/1964 | Netherlands ................. 321/27 MS |

*Primary Examiner*—Gerald Goldberg
*Attorney*—S. H. Hartz et al.

[57] ABSTRACT

A static inverter for converting D. C. power to three phase A. C. power which has a bridge circuit connected to the D. C. power source and including a plurality of silicon controlled rectifiers turned on by logic signals from a logic control circuit. A commutating circuit has silicon controlled rectifiers turned on by logic signals from the logic control circuit to control a single LC network to provide reverse polarity voltages to all the silicon controlled rectifiers in the bridge circuit to turn them off. Three phase A. C. power is provided by transformers having their primary windings connected to the bridge circuits and their secondary windings connected in series. The static inverter may include a plurality of bridge circuits and the relative phases of the logic signals to the bridge circuits is shifted to vary the phase relationship of the currents from the bridge circuits to change the amplitude of the three phase A.C. power from the transformers to avoid overloading the inverter in case of a short circuit in the load.

4 Claims, 21 Drawing Figures

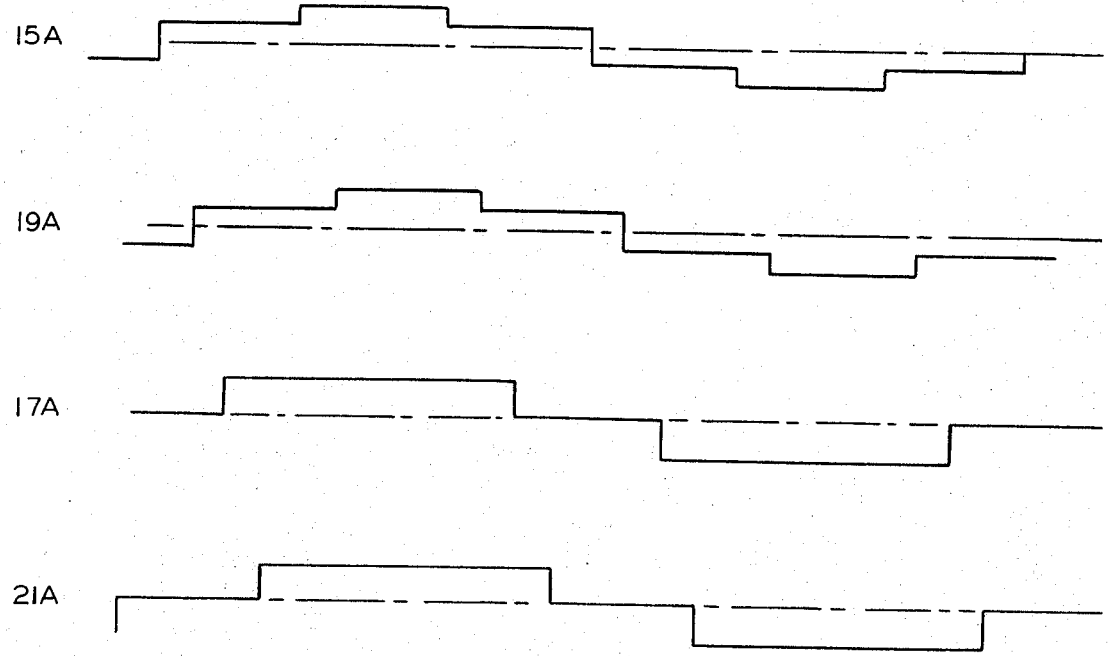
FIG. 2A
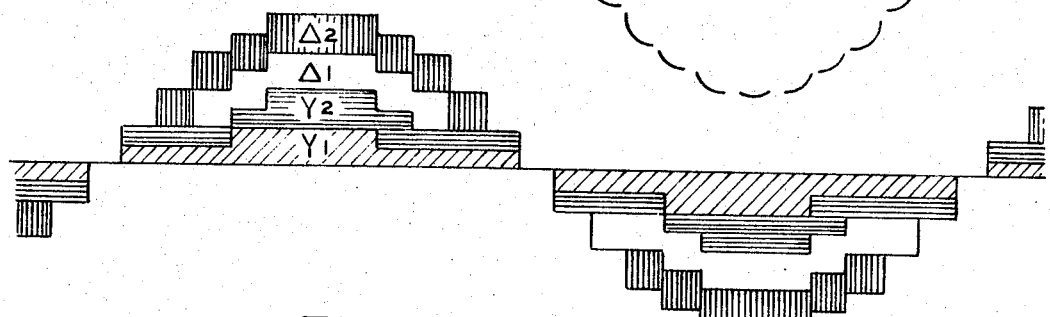
FIG. 2C
FIG. 2B
INVENTORS
ALBERT W. COMPOLY
ROBERT F. KAUTZ
FRANCIS X. FOERCH
ROBERT C. ECKENFELDER
BY
ATTORNEY

11A TRANSFORMER LINE CURRENT

11B SCR CURRENT

11C DIODE CURRENT

11D SCR CURRENT

11E DIODE CURRENT

CONSTANT FREQUENCY POWER INVERTER HAVING SILICON CONTROLLED RECTIFIER MULTIBRIDGE INPUTS FOR OUTPUT WAVE SHAPING WITH VARIABLE PHASE CONTROL FOR OVERLOAD CONDITIONS

The invention relates to inverters for supplying alternating current of constant frequency to an electrical load from a source of direct current and more particularly to such inverters using only solid state devices.

In the past, inverters using Silicon Controlled Rectifiers (SCRs) relied on passive commutation or self-commutation of the SCRs and this required large iron core inductors and bulky capacitors. Also, a separate commutation circuit was used for each SCR adding to the weight and complexity of the inverter. As a result, inverters used heretofore were heavy and were not completely reliable.

An inverter constructed according to the present invention has a logic circuit for providing logic signals for positively controlling the SCRs and the inverter uses a single active commutation circuit for each pair of SCR bridges which includes a relatively small inductor and capacitor. An inverter constructed according to the present invention provides highly reliable commutation of the SCRs and is relatively simple and trouble free.

One object of the present invention is to provide a solid state inverter using SCR bridges and having an active commutation circuit for controlling the SCRs to switch power from the source to the load.

Another object of the invention is to provide a solid state inverter in which the commutation circuit is light in weight and highly reliable and includes a minimum number of relatively small capacitors and inductors.

Another object is to commutate a substantial number of bridge SCRs with a single resonant L-C circuit.

Another object is to improve the efficiency of inverters using SCR bridges by providing a logic circuit which makes one SCR non-conducting or turns it off before making its complement conductor or turning it on.

Another object is to prevent excessive reverse voltages from appearing across the SCRs by providing paths for reactive current to flow after the SCRs are turned off.

Another object is to prevent switch through in the power bridge and in the commutation circuit.

Another object is to provide an inverter with improved power factor loading capability.

Another object is to protect the inverter from overload conditions.

Another object is to avoid shutting down the inverter when an overload occurs by gradually decreasing the inverter output by shifting the relative phases of the outputs of the SCR bridges.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

In the drawings,

FIG. 2A shows the waveforms of the output voltages under no load condition across one secondary winding of each of the transfers of FIG. 1. FIG. 2B shows one phase voltage provided by summing the voltages of FIG. 2A with the secondary windings connected in series; and FIG. 2C shows the waveform of the phase voltage shown in FIG. 2B at rated load.

Figure 1:
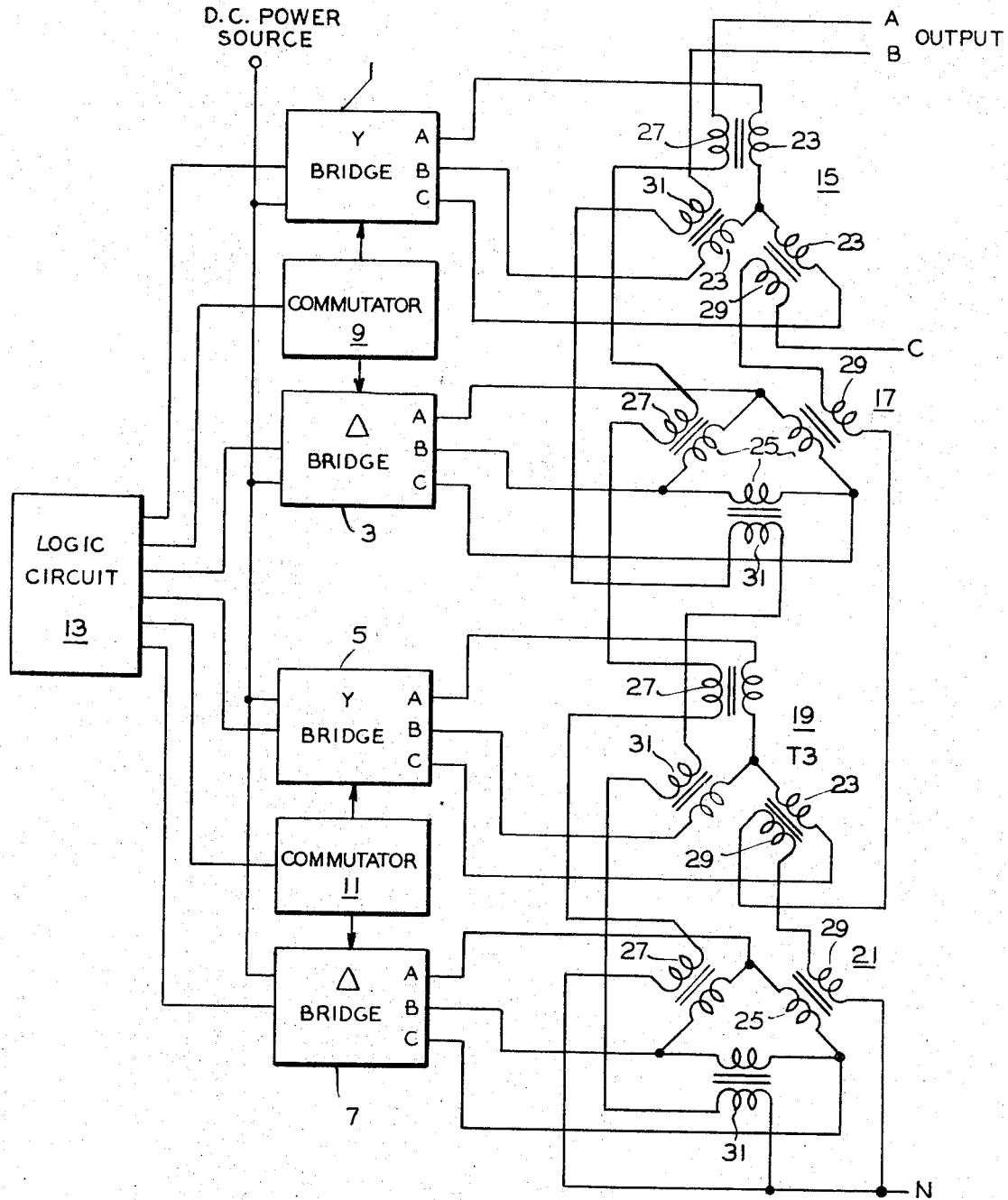
FIG. 1 is a block diagram showing an inverter constructed according to the invention.

Referring to the drawings, FIG. 1 shows a novel inverter constructed according to the invention. The inverter comprises SCR bridges 1, 3, 5 and 7 having their inputs connected to a DC power source. The power source may be a variable frequency generator which provides a 120 volt A.C. line to neutral voltage which is full wave rectified and filtered to produce approximately 280 volts D.C. A commutating circuit 9 is connected to bridges 1 and 3 and a commutating circuit 11 is connected to bridges 5 and 7. A logic circuit 13 is connected to the bridges and commutating circuits and provides signals shown in FIG. 4A for controlling conduction of the SCRs in the bridges and in FIG. 4B for controlling conduction of the SCRs in the commutating circuits. Each of the bridges provides three phases A, B, C separated by 120° to transformers 15, 17, 19 and 21 connected to the outputs of bridges 1, 3, 5 and 7, respectively. The primary windings 23 of transformers 15 and 19 are wye connected and the primary windings 25 of transformers 17 and 21 are delta connected. Each of the transformers has secondary windings 27, 29 and 31 and the secondary windings having the same numeral are connected in series to provide the vector sum of the voltage appearing across the secondary windings. With this arrangement a three phase output is provided by the inverter.

The waveforms of one phase voltage appearing across secondary windings 27 of transformers 15, 17, 19 and 21 under no load conditions are shown at 15A, 17A, 19A and 21A, respectively, in FIG. 2A and their vector sum is shown in FIG. 2B as a square wave under no load conditions. The vector sum under rated load conditions approaches a sine wave and is shown in FIG. 2C.

Since the natural symmetry points of a square wave voltage from a transformer having wye connected primary windings are at 90° and 270° and the natural symmetry points of a square wave voltage from a transformer having delta connected primary windings are at 60° and 240°, to obtain maximum voltage when taking their vector sum by connecting the secondary windings in series, the delta voltage 17A is programmed to lag the wye voltage 15A by 30° as shown in FIG. 2A so that both voltages are symmetrical about the 90° and 270° points. When the load requires a good wave form or high power capability, two additional three phase bridges and tranformers are used as in the present arrangement. For minimum distortion, the waveforms 19A and 21A of the second wye and delta transformers are arranged to lag the corresponding wave forms 15A and 17A of the first wye and delta transformers by 15° by programming the commutating signals for the second bridges to lag the commutating signals for the first bridges by 15°.

With the four three phase transformers connected as shown in FIG. 1 to provide a three phase output considerable interaction of the magnetic flux in the transformer iron occurs and this helps to shape the output current waveforms into sine waves.

Figure 3:
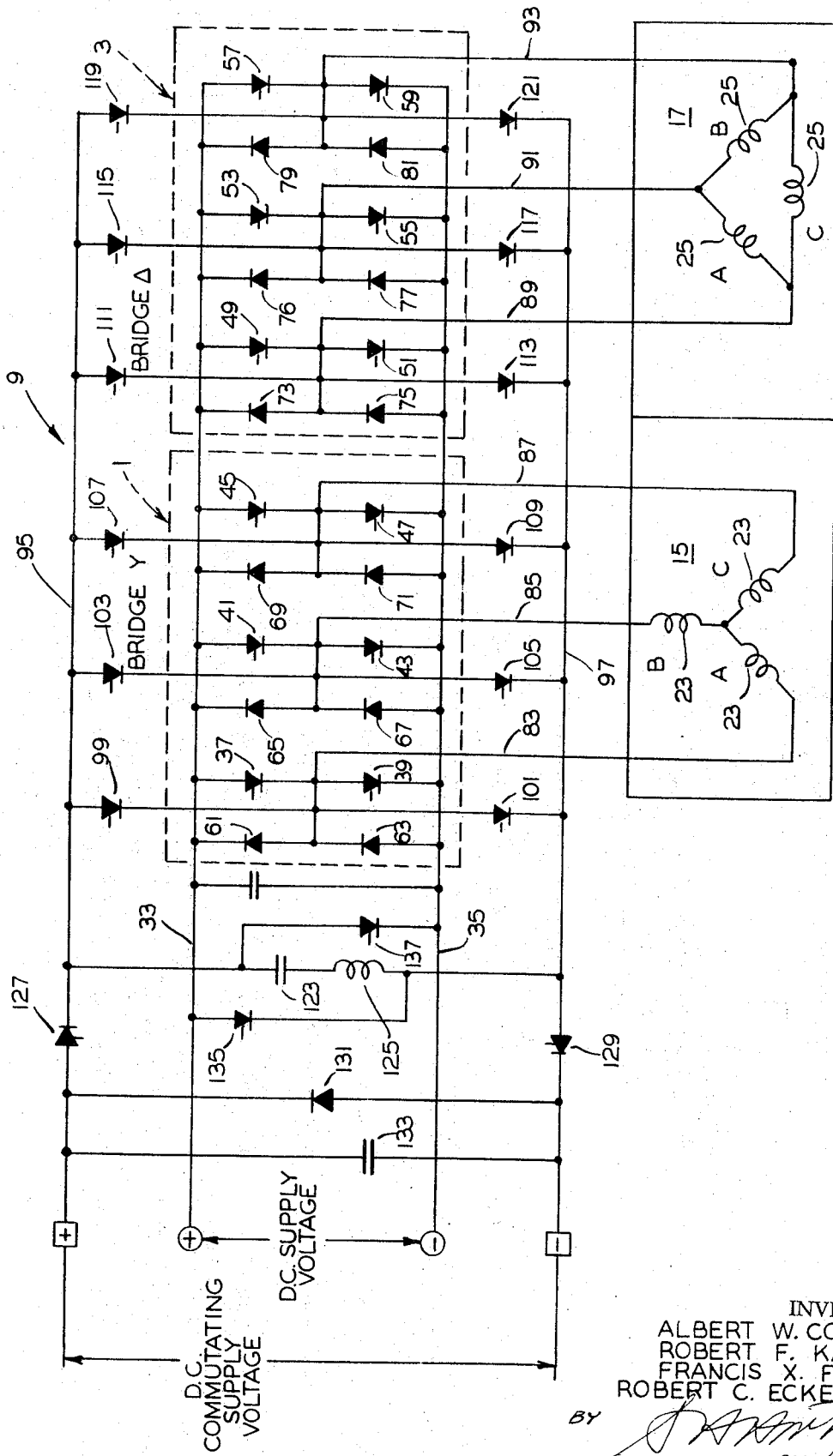
FIG. 3 is a schematic diagram of two bridge circuits and associated commutator shown in FIG. 1.

Bridges 1 and 3 and associated commutator 9 are shown schematically in FIG. 3. Bridges 5 and 7 and commutator 11 are identical to bridges 1 and 3 and commutator 9 so that only bridges 1 and 3 and commutator 9 will be described in detail.

Bridges 1 and 3 have a pair of input leads 33 and 35 connected to the positive and negative terminals, respectively, of the D.C. power source. Pairs of series connected SCRs 37 and 39, 41 and 43, 45 and 47, 49 and 51, 53 and 55, and 57 and 59 are connected in parallel between leads 33 and 35. Also, pairs of series connected diodes 61 and 63, 65 and 67, 69 and 71, 73 and 75, 76 and 77, and 79 and 81 also are connected in parallel between leads 33 and 35.

The junction between series connected SCRs 37, 39 and the junction between series connected diodes 61, 63 are connected by an output lead 83 to one wye connected primary winding 23 of transformer 15. Likewise, an output lead 85 connects the junction between series connected SCRs 41, 43 and the junction between series connected diodes 65, 67 to another wye connected primary winding 23 of transformer 15 and an output lead 87 connects the junction between series connected SCRs 45, 47 and the junction between series connected diodes 69, 71 to the third wye connected primary winding 23 of transformer 15.

An output lead 89 connects the junction between series connected SCRs 49, 51 and the junction between series connected diodes 73, 75 to one terminal of the delta connected primary windings 25 of transformer 17. An output lead 91 connects the junction between series connected SCRs 53, 55 and the junction between series connected diodes 76, 77 to a second terminal of the delta connected primary windings 25 of transformer 17. An output lead 93 connects the junction between series connected SCRs 57, 59 and the junction between series connected diodes 79, 81 to the third terminal of delta connected primary windings 25 of transformer 17.

Commutator 9 has a pair of leads 95 and 97 connected by SCRs 127 and 129 to the positive and negative terminals, respectively, of a D.C. source of commutating voltage which may be approximately 25 volts. Pairs of series connected SCRs 99 and 101, 103 and 105, 107 and 109, 111 and 113, 115 and 117, and 119 and 121 are connected in parallel between leads 95 and 97.

The junction between SCRs 99 and 101 is connected to output lead 83, the junction between SCRs 103 and 105 is connected to output lead 85, the junction between SCRs 107 and 109 is connected to output lead 87, the junction between SCRs 111 and 113 is connected to output lead 89, the junction between SCRs 115 and 117 is connected to output lead 91, and the junction between SCRs 119 and 121 is connected to output lead 93.

A capacitor 123 for storing commutation energy is connected in series with an inductor 125 between leads 95 and 97. Inductor 125 acts both as a current limiter for the commutation current and as a voltage booster for the commutation voltage. SCRs 127 and 129 are arranged to control current flow through capacitor 123 and inductance 125 for charging capacitor 123. A diode 131 and a capacitor 133 are connected in parallel across the commutating voltage source. An SCR 135 is connected between lead 33 and inductor 125 and an SCR 137 is connected between lead 35 and capacitor 123 for controlling discharge of capacitor 123 to back bias the SCRs in the bridge circuits to make them non-conducting or turn them off. The logic signals for making the SCRs conducting or turning on the SCRs in the bridge circuits are shown in FIG. 4A and the logic signals for turning on the SCRs in the associated commutator are shown in FIG. 4B.

OPERATION

As shown in FIG. 4A, every 30° an SCR in one of the bridges is turned on and its complement SCR is turned off. The SCRs in the bridges are turned on by applying the correspondingly numbered logic signals shown in FIG. 4A to their gates for 150°. The SCRs are turned "OFF," or made non-conducting after approximately 180° by discharging capacitor 123 and applying a reverse polarity voltage to the SCRs. The actual commutation is accomplished by causing current flow through the associated diode greater than the load current for more than 25 microseconds so that a one volt drop appears across the SCR with the cathode positive relative to the anode. The SCR turns off and stays off until it is again commanded on by a logic signal at its gate.

Figure 11:
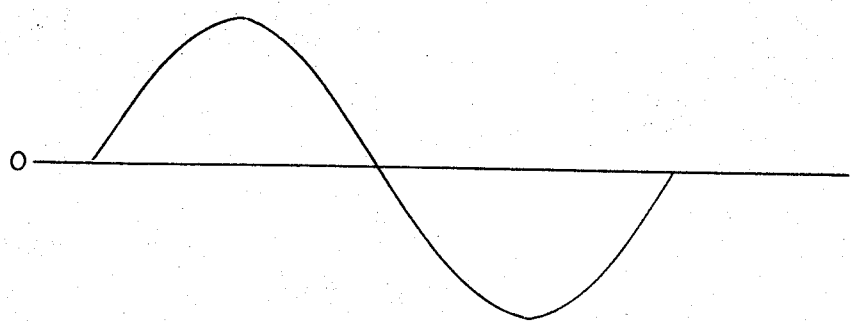
FIG 11A shows one cycle of the transformer primary current.
FIG. 11B and 11D show the current conducted by the SCRs and FIG. 11C and 11E show the current conducted by the diodes to provide the primary current shown in FIG. 11A under lagging load conditions.
Figure 11:
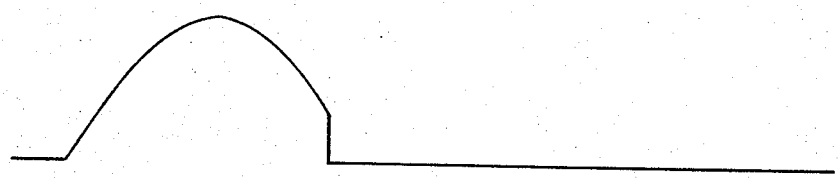
Figure 11:
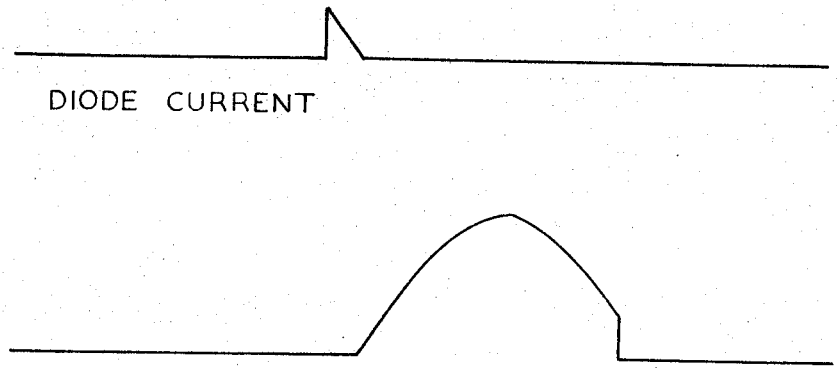
Figure 11:
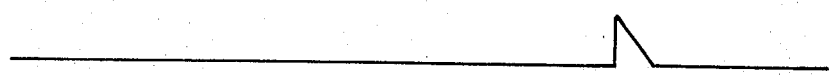

The diodes are connected in anti-parallel fashion with the associated SCRs in the bridges and conduct reactive current to the primary windings of the transformers after the SCRs are turned off as shown in FIGS. 11C and 11E. The diodes in parallel with the SCRs also prevent excessive reverse voltage from appearing across the SCRs.

An SCR is turned "OFF" before its complement SCR is turned "ON" to increase the overall efficiency of the inverter. The turn-off signal, preferably, precedes the complement's turn "ON" signal by a time T equal to at least one-half the resonant frequency of the L-C combination to avoid power losses.

Capacitor 123 is charged by turning on SCRs 127 and 129 by applying logic signals shown in FIG. 4B to their gates. Current flows from the positive terminal of the commutating source through SCR 127, capacitor 123, inductor 125, and SCR 129 to the negative terminal. Capacitor 123 and inductor 125 make up a resonant circuit which oscillates or rings at the resonant frequency. The resonant frequency of the charging circuit is chosen to be high enough so that the charging cycle can be completed well within the allotted time provided for this purpose. As the current in the resonant circuit reverses SCRs 127 and 129 turn off. As mentioned above, inductor 125 acts as a current limiter for the commutation current and as a voltage booster for the commutation voltage. The limiting voltage which appears across capacitor 123 is determined by the "Q" or quality factor of the resonant circuit so that V max. = Q times the supply voltage. A typical value for Q in this circuit is 15, so that with a 25 volt source of commutation voltage the voltage across capacitor 123 is 375 volts. For proper operation of the commutator circuit the voltage across capacitor 123 must be greater than the power source which, in the present arrangement, has been selected as 280 volts. Once capacitor 123 is charged by the commutating source and is discharged to turn "OFF" an SCR in a bridge, the commutating source need supply only power dissipated in the circuit because capacitor 123 recharges through diode 131 and condenser 133 when SCRs 127 and 129 are turned "ON."

From the logic signals shown in FIG. 4B, it will be observed that SCRs 127 and 129 are made conductive at 7.5° and every 30° thereafter to charge capacitor 123, which takes approximately 7.5°. There is then a pause of approximately 7.5° before commutating an SCR in the bridge circuits. As mentioned above, the gate drive signal is removed from the SCR in the bridge circuit approximately 30° before the SCR is turned "OFF" by discharging capacitor 123 as described below.

At 0° SCRs 51, 45, 57, 43 and 55 are conducting and a logic signal is applied to the gate of SCR 37 to turn it "ON." At 7.5° logic signals are applied to the gates of SCRs 127 and 129 to turn them "ON" to charge capacitor 123. As mentioned above, for most efficient operation the commutation pulse should precede turn on of the main bridge SCR by a minimum time period of $T = LC/2$. At 30° − T SCRs 113 and 137 are turned "ON" by applying logic signals to their gates to back bias SCR 51 and turn it "OFF." At 30° SCR 49 is turned on by a logic signal and the logic signal on SCR 45 is withdrawn, but SCR 45 continues to conduct. At 37.5° SCRs 127 and 129 are turned "ON" again by logic signals to charge capacitor 123. At 60° − T SCR 107 and SCR 135 are turned on to discharge capacitor 123 and turn "OFF" SCR 45. At 60° a logic signal is applied to the gate of SCR 47 to turn it on and the logic signal is withdrawn from the gate of SCR 57. At 67.5° SCRs 127 and 129 are turned on to again charge capacitor 123.

Figure 5A:
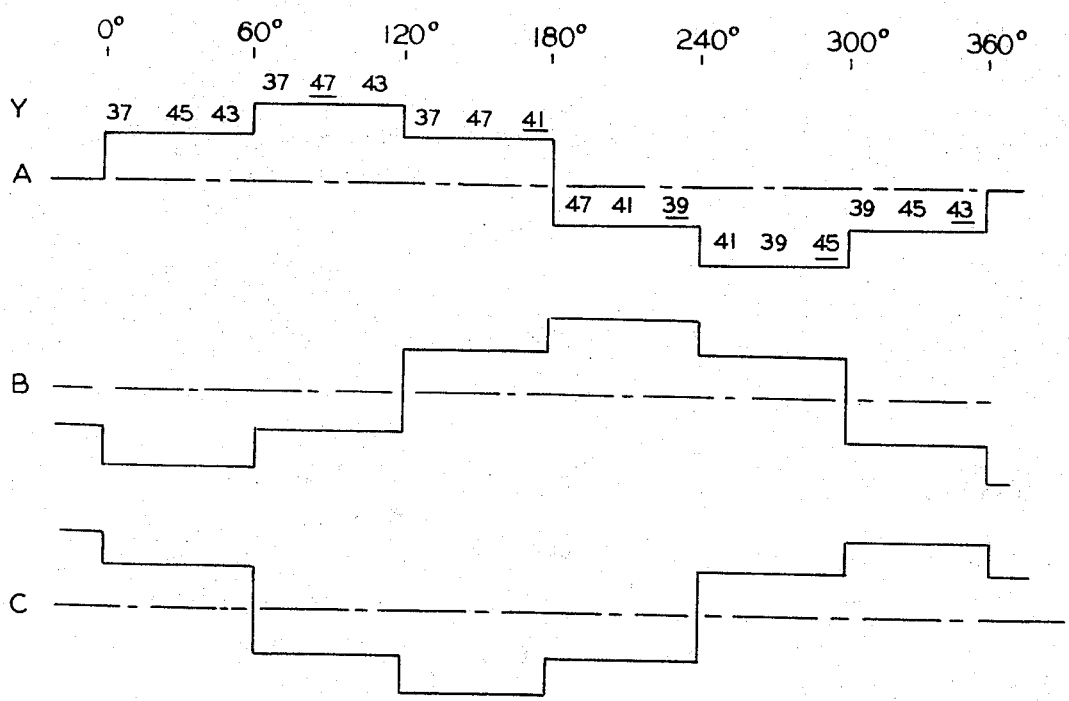
FIGS. 5A and 5B show the manner in which each of the phase voltages is generated by the bridge circuits shown in FIG. 3.
Figure 5B:
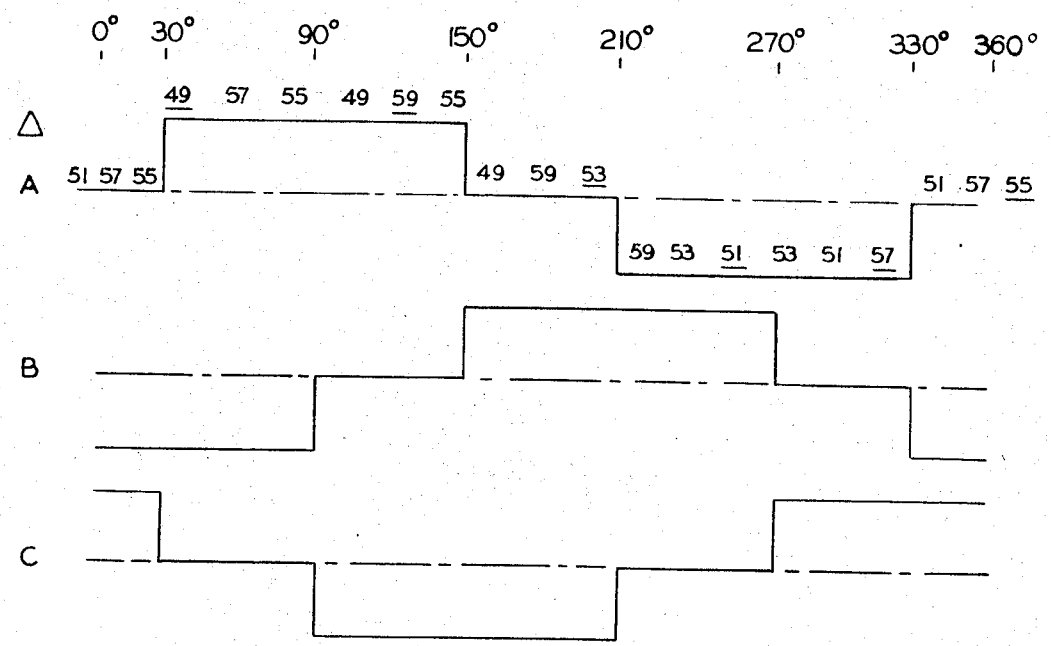

At 90° − T SCRs 119 and 135 are turned on by logic signals to discharge capacitor 123 and turn "OFF" SCR 57. This sequence for controlling the bridge SCRs continues in accordance with the logic signals shown in FIG. 5A and for controlling the commutating SCRs in accordance with the logic signals shown in FIG. 5B.

To turn off SCR 37, 41, 45, 49, 53 and 57, capacitor 123 discharges through lead 95 and through SCR 99, 103, 107, 111, 115 or 119, respectively, and through diode 61, 65, 69, 73, 76, or 79, respectively, through lead 33, SCR 135 and inductor 125. To turn off SCR 39, 43, 47, 51, 55 or 59 capacitor 123 discharges through SCR 137, lead 35, and through diode 63, 67, 71, 75, 77 or 81, respectively, and through SCR 101, 105, 109, 113, 117 or 121, respectively, lead 97, and inductor 125.

The commutation of all the SCRs in both the wye and delta connected three phase bridges is accomplished with a single resonant L-C circuit by using appropriate logic controls. The time interval between successive gating of any two SCRs is 30° which in a 400 cycle system is 208 microseconds, adequate time to perform all the necessary functions. This single commutating arrangement greatly reduces size and weight of the commutating circuit when compared with an independent commutating circuit for each SCR as used heretofore.

In the interval from 0° to 60° SCRs 37, 45, and 43 in wye bridge 1 are turned "ON" so that current flows from the positive terminal of the main power supply through lead 33, SCR 37, output lead 83, in a positive direction through the A phase of Y transformer winding 23, in a negative direction through the B phase of Y transformer winding 23, output lead 85, SCR 43 and lead 35 to the negative terminal of the main power supply. Current also flows from the positive terminal of the main power supply through lead 33, SCR 45, output lead 87, in a positive direction through the C phase of the transformer winding 23, in a negative direction through the B phase of transformer winding 23, output lead 85 SCR 43 and lead 35 to the negative terminal of the main power supply. It will be observed in FIG. 5A that phase A between 0° and 60° is positive one-half maximum, phase B is negative maximum, and phase C is positive one-half maximum.

From 60° to 120°, SCRs 37, 47, and 43 are turned "ON" and current flows from the positive terminal of the main power supply through lead 33, SCR 37, output lead 83, through Phase A of the transformer winding 23 in a positive direction, through Phase B of transformer winding 23 in a negative direction, output lead 85, SCR 43 and lead 35 to the negative terminal of the power supply, and through Phase C of transformer winding 23 in a negative direction through output lead 87, SCR 47, lead 35 to the negative terminal of the power supply. Phase A during this interval of from 60° − 120° is maximum positive, Phase B is one-half maximum negative and Phase C is one-half maximum negative.

From 120° to 180° SCRs 37, 47 and 41 are turned on and current flows through Phase A of transformer winding 23 in a positive direction, through Phase B of transformer winding 23 in a positive direction and through Phase C of transformer winding in a negative direction so that Phase A during this interval is one-half maximum positive, Phase B is one-half maximum positive, and Phase C is maximum negative. From 180° to 240° SCRs 47, 41 and 39 are turned on and current flows through Phase A of transformer winding 23 in a negative direction, through Phase B of transformer winding 23 in a positive direction, and through Phase C of transformer winding 23 in a negative direction so that during this interval Phase A is one-half maximum negative, Phase B is maximum positive, and Phase C is one-half maximum negative. From 240° to 300° SCRs 41, 39 and 45 are turned on and current flows through Phase A in a negative direction, through Phase B in a positive direction and through Phase C in a positive direction so that in this interval Phase A is maximum negative, Phase B is one-half maximum positive and Phase C is one-half maximum positive. From 300° to 360° SCRs 39, 45 and 43 are turned on and current flows through Phase A of transformer winding 23 in a negative direction, through Phase B of transformer winding 23 in a negative direction, and through Phase C of transformer winding 23 in a positive direction so that in this interval Phase A is one-half maximum negative, Phase B is one-half maximum negative and Phase C is maximum positive. The cycle then repeats over and over.

In the interval from 0° to 30° SCRs 51, 57 and 55 are turned on and no current flows through Phase A of transformer winding 25, current flows in a negative direction through Phase B of transformer winding 25, and in a positive direction through Phase C of transformer winding 25 so that in this interval Phase A is zero, Phase B is negative and Phase C is positive. In the interval from 30° to 90° SCRs 49, 57 and 55 in delta bridge 3 are turned on so that current flows through Phase A of delta transformer winding 25 in a positive direction, through Phase B of transformer winding 25 in a negative direction, and no current flows through Phase C of transformer winding 25 and in this interval Phase A is positive, Phase B is negative and Phase C is zero. From 90° to 150° SCRs 49, 59 and 55 are turned on and current flows through Phase A of transformer winding 25 in a positive direction, no current flows through Phase B and current flows through Phase C in a negative direction so that in this interval Phase A is positive, Phase B is zero and Phase C is negative. From 150° to 210° SCRs 49, 59 and 53 are turned on and no current flows through Phase A of transformer winding 25, current flows through Phase B of transformer winding 25 in a positive direction, and through Phase C of transformer winding 25 in a negative direction so that in this interval Phase A is zero, Phase B is positive and Phase C is negative. From 210° to 270° SCRs 59, 53 and 51 are turned on and current flows through Phase A of transformer winding 25 in a negative direction, through phase B of transformer winding 25 in a positive direction and no current flows through Phase C of transformer winding 25 so that in this interval Phase A is negative, Phase B is positive and Phase C is zero. From 270° to 330° SCRs 53, 51 and 57 are turned on and current flows through Phase A of transformer winding 25 in a negative direction, no current flows through Phase B and current flows through Phase C of transformer winding 25 in a positive direction so that Phase A is negative, Phase B is zero and Phase C is positive. The inverval from 330° to 360° is the same as the interval from 0° to 30° and SCRs 51, 57 and 55 are turned on and no current flows through Phase A of transformer winding 25, current flows in a negative direction through Phase B of transformer winding 25, and in a positive direction through Phase C of transformer winding 25 so that in this interval, Phase A is zero, Phase B is negative and Phase C is positive. The cycle repeats over and over.

It will be observed that the waveforms across the secondary windings 27, 29, 31 of the wye connected transformer 15 have two amplitudes, one-half maximum and maximum, whereas the waveforms across the secondary windings 27, 29, 31 of delta connected transformer 27 have only a single maximum amplitude. The reason for this is that current flows through all three primary windings 23 of the wye connected transformer 15 but through only two of the primary windings 25 of the delta connected transformer 17 during each of the intervals described above.

The waveforms for the outputs of transformers 19 and 21 are similar to the waveforms described in connectin with transformers 15 and 17 except that the waveforms of transformers 19 and 21 normally lag those of transformers 15 and 17 by 15° as mentioned above.

Figure 10:
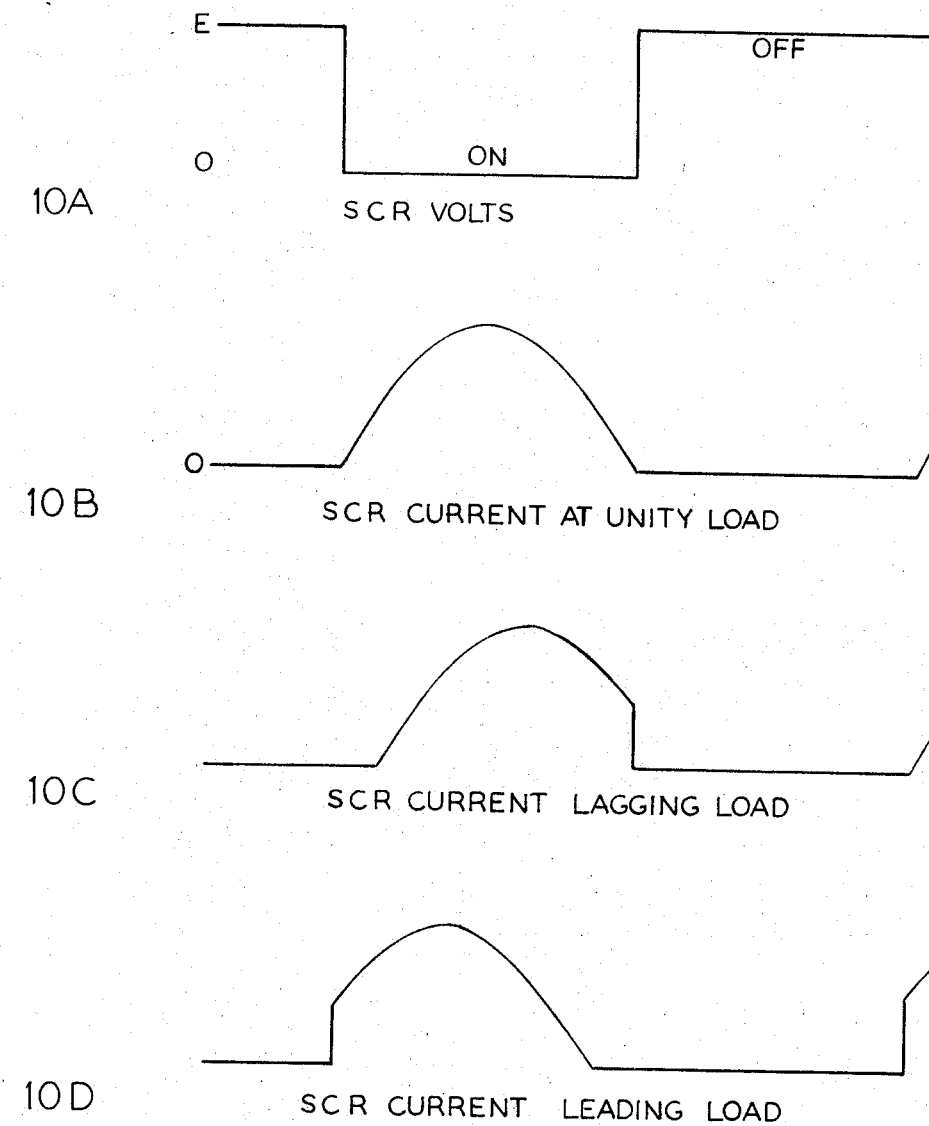
FIG. 10A shows the anode voltage on the SCRs in the circuit shown in FIG. 3, FIG. 10B, FIG. 10C and FIG. 10D show the current conducted by the SCRs at unity load, lagging load and leading load, respectively.

Although the anode voltage on an SCR in the bridges is a square wave as shown in FIG. 10A, the current conducted by the SCR is a semi-sine wave at unity load as shown in FIG. 10B. FIGS. 10C and 10E show the SCR current for lagging and leading loads, respectively.

The currents in the primary windings of the transformer are always a sine wave under rated load as shown in FIG. 11A. Since the currents in the SCRs change as a function of power factor loading as shown in FIGS. 11B and 11D, the associated diodes in parallel with the SCRs in the bridge circuits conduct the out of phase or reverse currents to the transformers as shown in FIGS. 11C and 11E assuring sine wave output currents even when the SCR currents depart from their semi-sine waveform. This reciprocal current sharing between the SCRs and the diodes gives the inverter excellent power factor loading capabilities in addition to the inherent power factor handling capability of the four transformer vector voltages which make up a single phase voltage because there is always more than one vector supplying power to the load.

While the inverter has been shown with conventional wye and delta primary wound transformers, the transformer shown and described in application Ser. No. 120,156 filed Mar. 2, 1971 and assigned to the same assignee as the present application is especially useful for providing phases A, B and C by taking the vector sum of the voltages at the outputs of the bridge circuits.

The inverter may be protected from overloads in several ways depending upon the application requirements and power capability of the inverter. For low power applications the circuit shown in FIG. 6 may be used. An SCR 139 is connected between the positive terminal of the main power supply and the input to the inverter and normally is conducting. When an overload is sensed SCR 139 is turned "OFF" for a short period to interrupt power. The circuit arrangement for turning SCR 139 "OFF" is a capacitor 141, an inductor 143 and an SCR 145 connected in series across the power supply. SCR 145 is turned "ON" by a gating pulse to charge condenser 141. SCR 145 is self-extinguishing when current stops flowing in inductor 143. An SCR 147 is connected across capacitor 141 and inductor 143 and is turned "ON" by a gating pulse to reverse the charge polarity on capacitor 141 so the capacitor is charged to the proper polarity and ready to be discharged when an overload occurs to turn off SCR 139. SCR 147 also is self-extinguishing and turns "OFF" when current stops flowing in inductor 143.

An SCR 149 is connected in a series circuit with SCR 139, capacitor 141 and inductor 143. A diode 151 is connected in parallel with SCR 139 to the input of the inverter. SCR 139 is turned "OFF" by turning "ON" SCR 149 by a gating pulse to permit capacitor 141 to discharge through inductor 143, SCR 149, and diode 151 to back bias SCR 139. SCR 149 also is self-extinguishing when current ceases to flow in inductor 143.

While SCR 139 is turned "OFF" and with no D. C. voltage at the input of the inverter it is safe to shift the outputs of bridges 5 and 7 relative to the outputs of bridges 1 and 3 until they are 180° out of phase as described hereinafter so that the load capability of the inverter is practically zero because the vectors from bridges 1 and 3 are cancelled by the vectors from bridges 5 and 7.

Because of unbalanced residual flux in the output transformers a soft re-start of the inverter is necessary. At restart, power from the power supply to the inverter is supplied through a series connected SCR 153 and a resistor 155 connected in parallel with SCR 139 to the input of the inverter. The resistance of resistor 155 is selected to provide current flow to the inverter having a safe value. Resistor 155 limits current flow to the inverter and provides soft restart of the inverter. This soft restart feature permits the output transformers to be much smaller and lighter besides improving the reliability of the inverter.

When the D. C. voltage is reapplied to the inverter as described above the outputs of bridges 5 and 7 are 180° out of phase with the outputs of bridges 1 and 3. Logic circuit 13 shifts the outputs of bridges 5 and 7 toward the normal 15° phase relationship with the outputs of bridges 1 and 3 at the rate of 7½° per cycle as described hereinafter until the output current reaches a safe level as sensed by a detector. The output current is then regulated at this amplitude. After the voltage of the inverter returns to the normal operating level SCR 139 is turned "ON" to by-pass resistor 155 and SCR 153.

Figure 8:
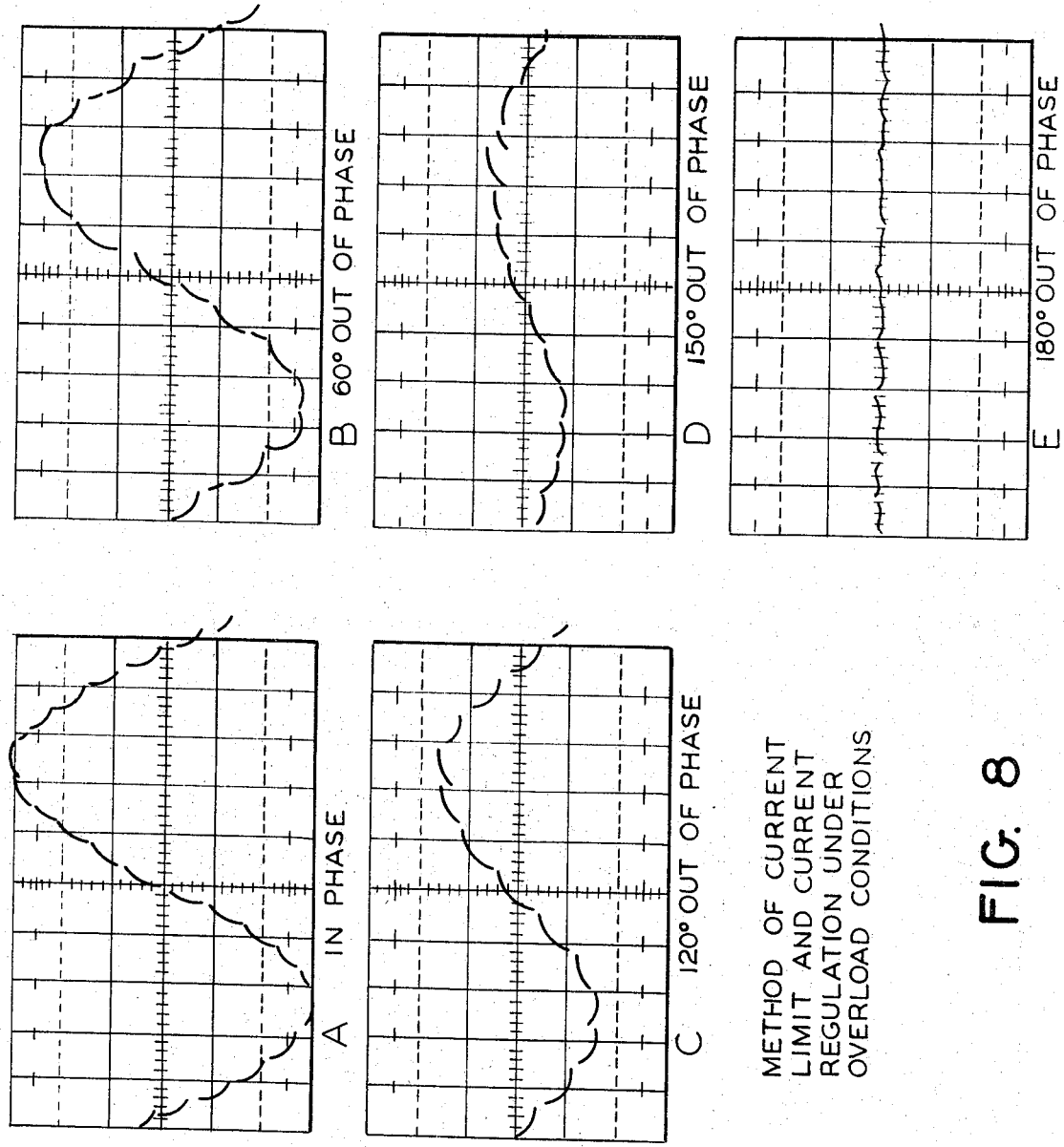
FIG. 8 shows output waveforms for one phase voltage when the outputs of the bridges are shifted in phase relative to one another to avoid overload.

The current limiting action of the inverter for various phase separations of the outputs of bridges 5 and 7 relative to the outputs of bridges 1 and 3 are shown in FIG. 8. FIG. 8A shows the normal 15° in phase relationship, FIG. 8B shows the outputs 60 out of phase, FIG. 8C shows the outputs 120° out of phase, FIG. 8D shows the outputs 150° out of phase, and FIG. 8E shows the outputs 180° out of phase. It will be observed that the amplitude of the output of the inverter decreases from a maximum in FIG. 8A to zero in FIG. 8E as the phase difference is increased from 15° to 180°.

Figure 7:
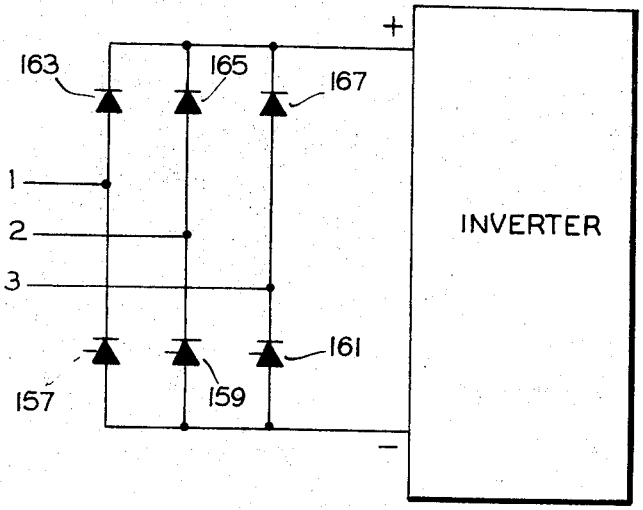

As shown in FIG. 7, when the three phase output of an alternating current generator is used with a full wave rectifier for converting the alternating current voltage to direct current voltage to provide the main power source, SCRs 157, 159 and 161 may be used in the full wave rectifier with diodes 163, 165 and 167. SCR 157 and diode 163 are connected across the input to the inverter and one phase of the generator output is connected to the junction of the SCR and diode. Similarly SCR 159 and diode 165 are connected across the input to the inverter and the second phase of the generator is connected to the junction of the SCR and diode. SCR 161 and diode 167 are connected across the input to the inverter and the third phase of the generator output is connected to the junction of the SCR and diode. By removing the gate drive to SCRs 157, 159 and 161, the input voltage to the inverter will stop in one cycle of the generator because the SCRs will self commutate.

With no D. C. voltage at the input of the inverter it is safe to shift the outputs of bridges 5 and 7 so they are 180° out of phase with the outputs of bridges 1 and 3 as described hereinafter to reduce the output voltage of the inverter to zero. SCRs 157, 159 and 161 in the full wave rectifier are phase controlled at their gates to re-apply the D.C. voltage to the inverter with a controlled rate of rise to provide a soft restart and prevent failure of the inverter. Also, logic circuit 13 shifts the outputs of bridges 5 and 7 toward the normal 15° phase relationship with the outputs of bridges 1 and 3 at the rate of 7½° per cycle as described hereinafter until the output current reaches a safe value as described above in connection with FIG. 6.

The arrangements described for handling overloads require that the output of the inverter be momentarily interrupted. A third arrangement for handling overloads without interrupting the output of the inverter although permitting overload current to appear at the load for a finite period is described below. In this arrangement the logic circuit shifts the phase relationship of the bridges 1 and 3 relative to bridges 5 and 7 in discrete steps of 7½° per cycle in either direction for a full 360° as described below. When an overload is detected the outputs of bridges 5 and 7 are shifted out of phase relative to the outputs of bridges 1 and 3, 7½° per cycle to reduce the output of the inverter. In 22 cycles the outputs of bridges 5 and 7 can be shifted so that the outputs of bridges 5 and 7 are 180° out of phase with the outputs of bridges 1 and 3 and the output of the inverter is zero. A more suitable mode of operation is to phase shift the outputs of bridges 5 and 7 relative to the outputs of bridges 1 and 3 only enough so that the inverter provides a safe amount of current, and the output is regulated around this level for a specified length of time.

Figure 4:
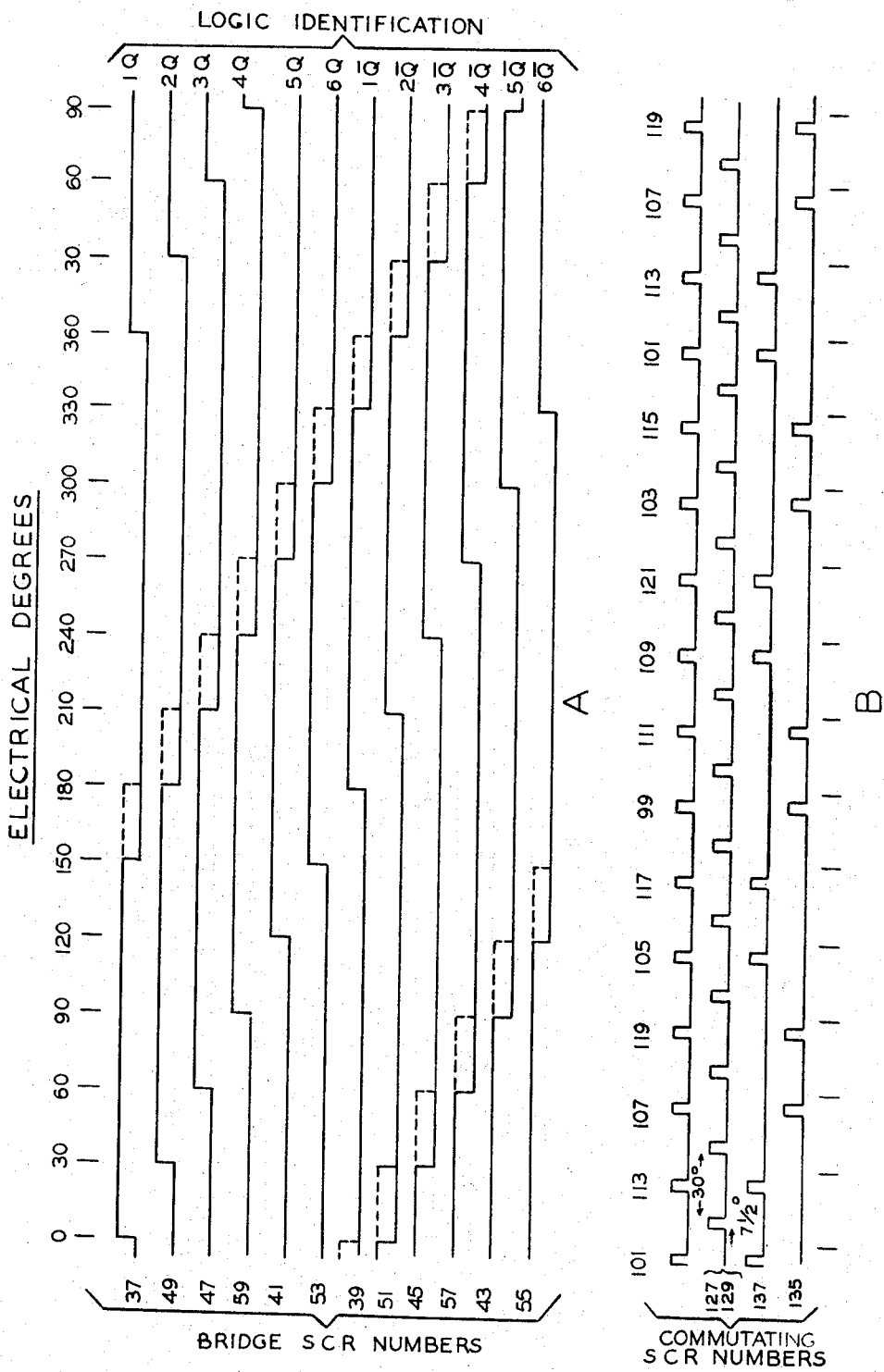
FIG. 4 shows the logic signals applied to the gates of the SCRs for controlling the bridges and associated commutator shown in FIG. 3.
Figure 9:
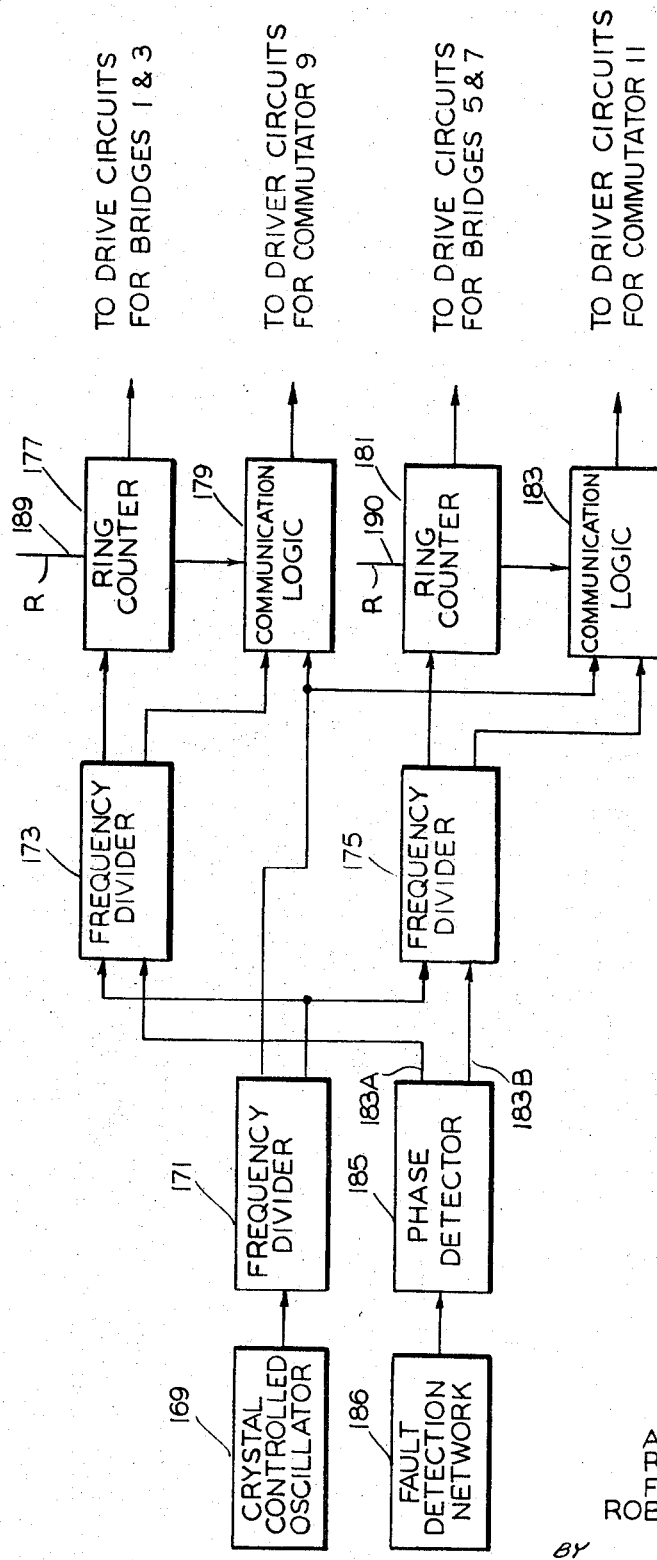
FIG. 9 is a block diagram showing a logic circuit for producing the logic signals shown in FIG. 4.

Referring to FIG. 9 the logic circuit 13 for providing the logic signals shown in FIG. 4 has a crystal controlled oscillator 169 which provides the precise frequency control required. The oscillator preferably is a linear operational amplifier with a crystal in the feed back path and provides a frequency of 76.8 K Hz. A frequency divider 171 is connected to oscillator 169 and has two flip-flops to divide the frequency by four and to equalize the duty cycle. Frequency dividers 173 and 175 are connected in parallel to an output of frequency divider 171 and each frequency divider 173, 175 has two flip-flops to again divide the frequency by four and each frequency divider provides an output having a frequency of 4.8 K Hz. With this arrangement the outputs of frequency dividers 173 and 175 can be independently controlled as described hereinafter.

A ring counter 177 is connected to frequency divider 173 and has its output connected to bridges 1 and 3 and provides the signals shown in FIG. 4A for turning on the bridge SCRs. A commutation logic circuit 179 is connected to ring counter 177 and to frequency dividers 171 and 173 and has its output connected to commutator 9 to provide the signals shown in FIG. 4B for turning on the commutating SCRs.

Similarly a ring counter 181 is connected to frequency divider 175 and has its output connected to bridges 5 and 7 and provides signals corresponding to the signals shown in FIG. 4A, but lagging these signals by 15° for turning on the bridge SCRs. A commutation logic circuit 183 is connected to ring counter 181 and to frequency dividers 171 and 175 and has an output connected to commutator 11 and provides signals corresponding to those shown in FIG. 4B, but lagging these signals by 15° for turning on the commutating SCRs.

A phase detector 185 has one output 183A connected to the input of frequency divider 173 and second output 183B connected to the input of frequency divider 175 and continuously monitors the outputs of ring counters 177 and 181 and commutation logic circuits 179 and 183 to provide the normal 15° phase separation between the signals described above. A fault detection network 186 is connected to phase detector 185. If the output of frequency divider 173 leads the output of frequency divider 175 by less than 180° the output of frequency divider 175 is delayed relative to the output of frequency divider 173 and shifted back into the proper phase relation at 7½° per cycle. If the output of frequency divider 175 lags the output of frequency divider 173 by less than 180° then the output of frequency divider 173 is delayed relative to the output of frequency divider 175 at the same rate. This is accomplished by phase detector 185 removing one clock pulse from the output of either frequency divider 173 or frequency dividier 175 by inhibiting the first flip-flop of frequency divider 173 or 175. To inhibit the flip-flop a zero voltage pulse is applied to both inputs of the flip-flop and this prevents any response to the clock pulse.

The logic circuit described above is exemplary only and it should be understood that any logic circuit which produces the pulse trains shown in FIG. 4 may be used.

Figure 6:
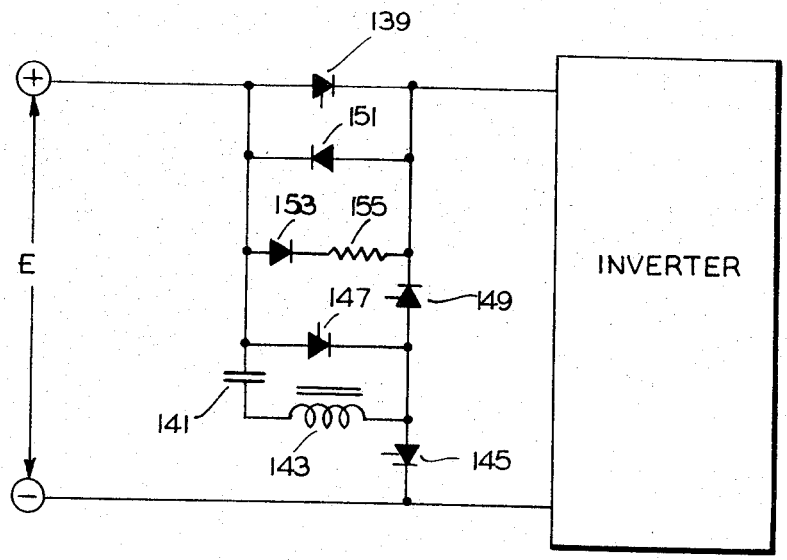
FIGS. 6 and 7 are schematic diagrams of two circuits for handling overload conditions.

To instantly shift the outputs of bridges 5 and 7 relative to the outputs of bridges 1 and 3 180° out of phase as described in connection with the circuit shown in FIG. 6, a reset signal is applied to each of the ring counters 177 and 181 on leads 189 and 190, respectively, in FIG. 9 when the D.C. voltage is zero. This shifts the outputs of the ring counters 180° out of phase. Phase detector 185 reduces the phase separation 7½° per cycle for 22 cycles until the two signals are normally phase separated by 15°. In connection with the circuit shown in FIG. 7, if the fault detector 186 in FIG. 9 produces a signal during this time the outputs of phase detector 185 connected to frequency dividers 173 and 175 are interchanged and the outputs of frequency dividers 173 and 175 clock toward 180° phase separation in 7½° increments per cycle until the fault signal disappears, whereupon the outputs of phase detector 185 again reverse with respect to frequency dividers 173 and 175 and the outputs of frequency dividers 173 and 175 clock toward the normal 15° phase separation at 7½° per cycle. This arrangement can be used for fault detection regulation of either voltage or current.

The operation of the arrangement described above for handling overloads without interrupting the output of the inverter although permitting overload current to appear at the load for a finite period operates in the same manner as explained above with the exception that instead of shifting the outputs of bridges 1 and 3 relative to bridges 5 and 7 in 180° phase opposition, the phase relationship of the outputs of bridges 1 and 3 relative to bridges 5 and 7 are shifted by the logic circuit in discrete steps of 7½° per cycle to reduce the output of the inverter only enough so that the inverter provides safe current. The output is regulated by phase detector 185 around this level for a specified length of time as described above.

An inverter constructed according to the invention is compatible with a wide range of input voltages. It will operate on D. C. or A. C. up to 5,000 Hz with proper regulation. For D. C. or low frequency application it is desirable to use the phase shift arrangement to control output voltage. For higher frequency (50 —5,000 Hz) application the input voltage preferably is regulated by means of a phase controlled bridge. In hybrid configurations the field of the generator can be regulated to control the output voltage.

What is claimed is:

1. A static inverter for converting D.C. power to multiphase A.C. power, comprising at least two bridge circuits connected to the D.C. power source and including a plurality of switching means, a logic control circuit connected to the bridge circuits and providing signals for controlling the switching means in predetermined sequence to conduct current, summing means connected to the bridge circuits and energized by currents therefrom and providing the multiphase A.C. power, the logic control circuit having means for changing the relative phase relationship of the logic signals to the bridge circuits the discrete steps to vary the phase relationship of the currents from the bridge circuits, and fault detecting means for sensing an overload and controlling the phase changing means to reduce the multiphase A.C. power from the summing means to a safe value when an overload occurs.

2. An inverter as described in claim 1 in which the phase changing means upon removal of the overload changes the relative phase relationship of the logic signals to the bridge circuits in discrete steps to increase the three phase A.C. power from the transformer means to normal.

3. A static inverter for converting D.C. power to multiphase A.C. power, comprising at least two bridge circuits connected to the D.C. power source and including a plurality of switching means, a logic control circuit connected to the bridge circuits and providing signals for controlling the switching means in predetermined sequence to conduct current, and summing means connected to the bridge circuits for summing the currents therefrom and providing the multiphase A.C. power, fault detection means, means responsive to the fault detection means for reducing power to the inverter substantially to zero in response to a fault, the logic control circuit having means for instantaneously shifting the relative phases of the logic signals to the bridge circuits 180° out of phase when power to the inverter is reduced substantially to zero to vary the phase relationship of the currents from the bridge circuits and change the amplitude of the multiphase A.C. power from the summing means substantially to zero, and for shifting the relative phases of the logic signals in discrete steps to restore the multiphase A.C. power from the transformer means to a safe value when power is restored to the inverter.

4. A static inverter for converting D. C. power to multiphase A.C. power comprising: a bridge circuit connected to the D.C. power source and including a plurality of silicon controlled rectifiers, a logic control circuit connected to the bridge circuit and providing signals for turning on the silicon controlled rectifiers in predetermined sequence to conduct current, a commutating circuit connected to the bridge circuit and to the logic control circuit and including an L.C. network and switching means, the logic control circuit providing signals for operating the switching means in predetermined sequence to charge and discharge a capacitor in the L.C. network to provide reverse polarity voltages to the silicon controlled rectifiers in the bridge circuit to turn them off, the commutating circuit being connected to a source of commutating voltage, and a condenser and a diode connected across the commutating voltage source to assist in recharging the capacitor in the L.C. network when the switching means in the commutating circuit are operated, and transformer means connected to the bridge circuit and energized by current therefrom and providing the multiphase A.C. power.

* * * * *